(12) United States Patent
Takemura et al.

(10) Patent No.: US 6,302,227 B1
(45) Date of Patent: Oct. 16, 2001

(54) HYBRID POWERED VEHICLE

(75) Inventors: Tadashi Takemura, Okazaki; Kaoru Sawase, Aichi, both of (JP)

(73) Assignee: Mitsubishi Jidosha Kogyo Kabushiki Kaisha (JP)

( * ) Notice: Subject to any disclaimer, the term of this patent is extended or adjusted under 35 U.S.C. 154(b) by 0 days.

(21) Appl. No.: 09/493,333

(22) Filed: Jan. 28, 2000

(30) Foreign Application Priority Data

Jan. 29, 1999 (JP) .................................................. 11-021923

(51) Int. Cl.$^7$ ....................................................... B60K 1/00
(52) U.S. Cl. .............................. 180/65.2; 180/65.7; 477/3
(58) Field of Search ................... 180/65.2, 65.6, 180/65.1, 65.3, 65.4, 65.5, 65.7; 477/2, 3; 475/210, 211

(56) References Cited

U.S. PATENT DOCUMENTS

| | | | |
|---|---|---|---|
| 5,433,282 | * 7/1995 | Moroto et al. | 180/65.2 |
| 5,571,058 | * 11/1996 | Schmidt | 477/3 |
| 5,806,617 | * 9/1998 | Yamaguchi | 180/65.2 |
| 5,846,155 | * 12/1998 | Taniguchi et al. | 477/2 |
| 5,873,426 | * 2/1999 | Tabata et al. | 180/65.7 |
| 5,895,333 | * 4/1999 | Morisawa et al. . | |
| 5,934,395 | * 8/1999 | Koide et al. | 180/65.2 |
| 5,935,035 | * 8/1999 | Schmidt | 477/2 |
| 5,982,045 | * 11/1999 | Tabata et al. . | |
| 6,048,288 | * 4/2000 | Tsujii et al. | 180/65.4 |
| 6,110,066 | * 8/2000 | Nedungadi et al. . | |

* cited by examiner

Primary Examiner—Brian L. Johnson
Assistant Examiner—Bryan Fischmann
(74) Attorney, Agent, or Firm—Rossi & Associates

(57) ABSTRACT

A hybrid powered vehicle is capable of running forward and backward under various conditions (e.g., by a motor) and enables the regeneration of energy during the reduction of speed without increasing the full length, weight, cost and the like of a transmission. The hybrid powered vehicle has a planetary gear unit, which comprises the following three elements: a ring gear, a sun gear, and a carrier pivotally supporting a planetary pinion arranged between the carrier and the sun gear. The planetary gear unit is disposed between an engine and an electric motor. The hybrid powered vehicle also has a forward/backward rotation switching mechanism, which comprises a brake for braking a first element that is one of the above-mentioned three elements and a clutch for connecting and disconnecting two elements among the above-mentioned three elements. An output shaft of the engine connects to one of the two elements other than the first element, and an output shaft of the electric motor and an input shaft of the transmission connect to the other.

15 Claims, 4 Drawing Sheets

Fig.2

| DRIVING DIRECTION | | | DRIVING MODE | | |
|---|---|---|---|---|---|
| | | | DRIVE BY MOTOR | DRIVE BY ENGINE | DRIVE BY MOTOR AND ENGINE |
| FORWARD | MOTOR | | FORWORD ROTATION | IDLE | FORWORD ROTATION |
| | ENGINE | | STOP | FORWORD ROTATION | FORWORD ROTATION |
| | CLUTCH | | OFF | ON | ON |
| | BRAKE | | OFF | OFF | OFF |
| BACKWORD | MOTOR | | BACKWORD ROTATION | IDLE | BACKWORD ROTATION |
| | ENGINE | | STOP | FORWORD ROTATION | FORWORD ROTATION |
| | CLUTCH | | OFF | OFF | OFF |
| | BRAKE | | OFF | ON | ON |

HYBRID POWERED VEHICLE

BACKGROUND OF THE INVENTION

1. Field of the Invention

This invention relates generally to a hybrid powered vehicle that has an engine and an electric motor.

2. Description of Related Art

A hybrid powered vehicle is known which has both an engine and an electric motor and is selectively driven by the engine and/or the electric motor. Hybrid powered vehicles are roughly classified into series hybrid powered vehicles and parallel hybrid powered vehicles. The series hybrid powered vehicle uses an output of the engine for power generation only, and is driven exclusively by an output of the electric motor. On the other hand, the parallel hybrid powered vehicle can be driven by the output of the engine and/or the electric motor depending on the driving conditions. Thus, the parallel hybrid powered vehicle requires a drive system that is capable of transmitting the output of the engine and the electric-motor to an axle.

FIG. 6 schematically shows the structure of the drive system in the conventional parallel hybrid powered vehicle. As shown in FIG. 6, an electric motor 72 is arranged between an engine 70 and a transmission 80, and a rotor 73 of the electric motor 72 is axially and fixedly integrated with an output shaft 71 of the engine 70. Reference numeral 74 denotes a stator, which is fixed to a transmission case 81. Accordingly, the output of the engine and the electric motor is transmitted from the output shaft 71 of the engine 70 to an input shaft 82. Then, the output of the engine and the electric motor goes through a forward/backward rotation switching mechanism 83, and is converted by a continuously variable transmission mechanism 84. The output is finally transmitted to an axle.

In the above-mentioned conventional hybrid powered vehicle, the engine 70 and the electric motor 72 always rotate as one, and it is therefore impossible to use only the electric motor 72 as the drive source for the vehicle with the engine 70 being stopped. It is also impossible to regenerate energy solely by the electric motor 72 without running an engine brake during speed reduction.

To address this problem, it is necessary to provide a clutch mechanism between the engine 70 and the motor 72 so as to stop the transmission of the output between the engine 70 and the input shaft 82. This increases the full length, weight, cost and the like of the transmission 80.

SUMMARY OF THE INVENTION

It is therefore an object of the present invention to provide a hybrid powered vehicle that is capable of running forward and backward under various conditions (i.e., the vehicle is driven by either one or both of an electric motor and an engine) and enables the regeneration of energy during speed reduction without increasing the full length, weight, cost and the like of a transmission.

The above object may be accomplished according to a principle of the present invention, which provides a hybrid powered vehicle, which has an engine and a transmission, the hybrid powered vehicle comprising: a forward/backward rotation switching mechanism arranged between the engine and the electric motor; wherein the forward/backward rotation switching mechanism comprises: a planetary gear unit composed of the following three elements: a ring gear, a sun gear and a carrier pivotally supporting a planetary pinion arranged between the ring gear and the sun gear; and a brake for braking a first element that is one of the three elements; connecting means for connecting and disconnecting two elements among the three elements; and wherein an output shaft of the engine is connected to a second element that is one of two elements except the first element, and an output shaft of the electric motor and an input shaft of the transmission are connected to a third element that is the other element of the two elements except the first element.

Therefore, disengaging the brake and the clutch enables the vehicle to be driven solely by the electric motor and makes possible the regeneration of energy during speed reduction. The vehicle is driven forward by disengaging the brake, engaging the clutch and rotating the electric motor and the engine forward. The vehicle is driven backward by engaging the brake, disengaging the clutch, rotating the electric motor backward and rotating the engine forward.

The planetary gear unit is preferably a double pinion gear, which substantially equalizes a reduction gear ratio during the forward driving and the backward driving.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 2 is a table showing a relationship between the vehicle driving directions and the rotating directions of an engine and an electric motor and the ON/OFF state of a clutch and a brake in each driving mode of a hybrid powered vehicle according to the first embodiment of the present invention;

DETAILED DESCRIPTION OF THE PREFERRED EMBODIMENT

The invention will be described in further detail by way of example with reference to the accompanying drawings.

Figure 1:
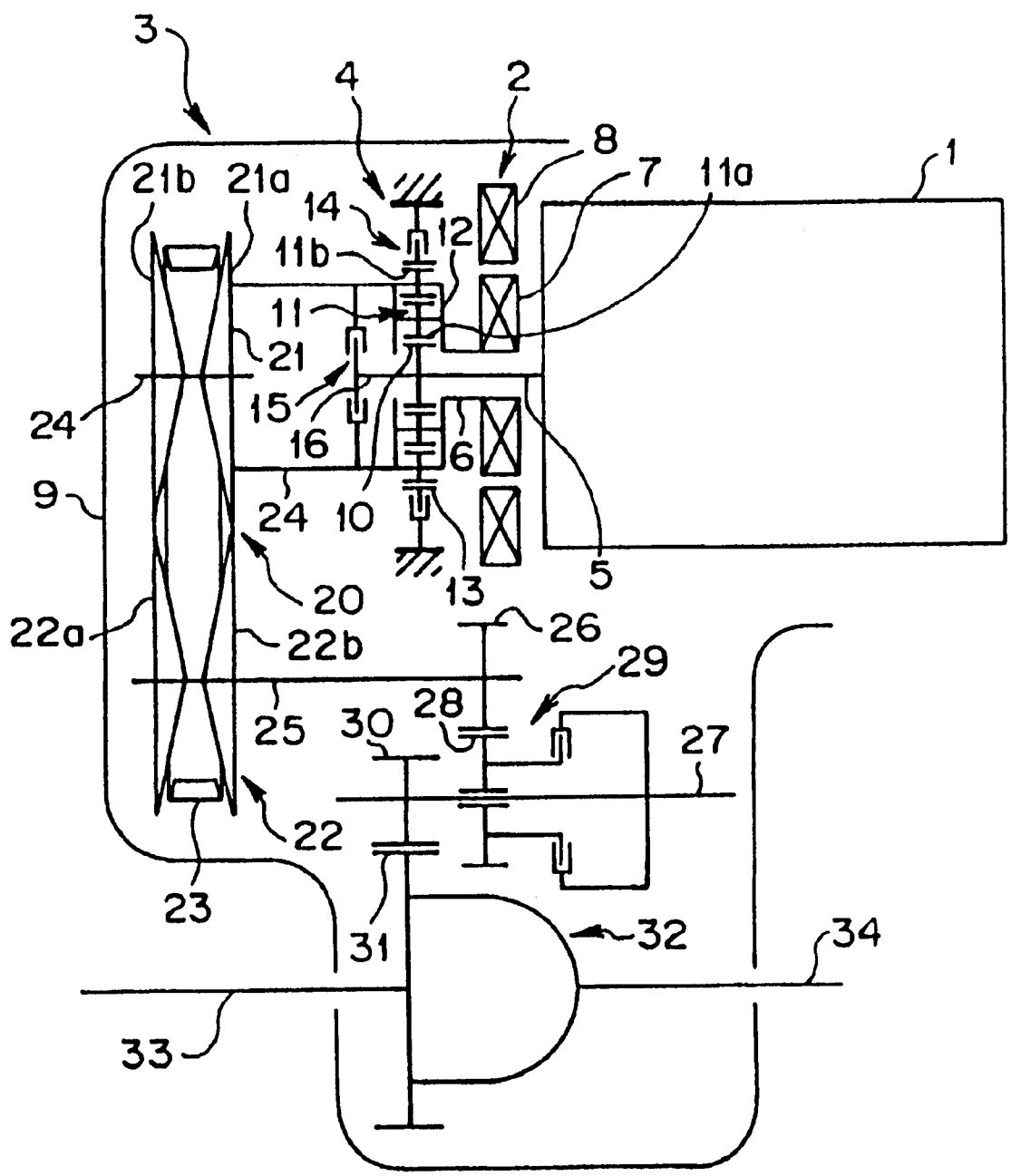
FIG. 1 is a view schematically showing the structure of a hybrid powered vehicle according to the first embodiment of the present invention.

FIGS. 1 and 2 are directed to a hybrid powered vehicle according to a first embodiment of the invention, wherein FIG. 1 outlines the structure of the hybrid powered vehicle with rotary shafts 5, 24, 25, 27, 33, 34 arranged in parallel.

As shown in FIG. 1, the hybrid powered vehicle has an engine 1, an electric motor 2 and a transmission 3. A transmission case 9 for the transmission 3 is fixedly integrated with the engine 1. The electric motor 2 is coaxial with an output shaft 5 of the engine 1. The output shaft 5 goes through an output shaft 6 of the electric motor 2, which is coaxially integrated with a rotor 7. A stator 8 of the electric motor 2 is fixed to the transmission case 9.

A forward/backward rotation switching mechanism 4 is arranged between the engine 1 and the electric motor 2 and a continuously variable transmission mechanism 20 of the transmission 3. The rotations inputted from the engine 1 and the electric motor 2 are inputted to the continuously variable transmission mechanism 20 through the forward/backward rotation switching mechanism 4.

A planetary gear unit is used as the forward/backward rotation switching mechanism 4, and the output shaft 5 of the engine 1 connects to a sun gear 10 (the second element) of the planetary gear unit. A carrier (the third element) for holding a pinion gear (a planetary pinion) 11 connects to the output shaft 6, which is coaxially fixed to the rotor 7 of the electric motor 2. Accordingly, the rotation of the engine 1 is inputted from the sun gear 10, and the rotation of the electric motor 2 is inputted from the carrier 12. The pinion gear 11 is a double pinion gear composed of an inner pinion (an inner gear) 11a and an outer pinion (an outer gear) 11b, which are engaged with one another. The inner gear 11a is engaged with the sun gear 10, and the outer gear 11b is engaged with a ring gear (the first element) 13.

The rotation of the forward/backward rotation switching mechanism 4 is outputted to the continuously variable transmission mechanism 20 through the carrier 12. More specifically, an input shaft 24 coaxially integrated with a primary pulley 21 of the continuously variable transmission mechanism 20 connects to the continuously variable transmission mechanism 20 of the carrier 12. The rotation of the engine 1 and the electric motor 2 is inputted to the sun gear 10 and the carrier 12, respectively, and is then outputted from the carrier 12 to the input shaft 24.

The ring gear 13 has a brake 14, which is fixed to the transmission case 9. Therefore, engaging the brake 14 restricts the rotation of the ring gear 13. If the brake 14 is disengaged, the ring gear 13 becomes capable of rotating with the rotation and revolution of the pinion gear 11.

A clutch 15 is arranged inside the input shaft 24 of the continuously variable transmission mechanism 20. The clutch 15 connects and disconnects a shaft 16, which extends from the sun gear 10 to the continuously variable transmission mechanism 20, and the input shaft 24. The engagement of the clutch 15 causes the sun gear 10 integrated with the shaft 16 and the carrier 12 integrated with the input shaft 24 to rotate as one.

As stated above, the rotation inputted from the engine 1 and the electric motor 2 is outputted from the forward/backward rotation switching mechanism 4 to the continuously variable transmission mechanism 20. The continuously variable transmission mechanism 20 is composed of the primary pulley 21, a secondary pulley 22 and a belt 23. The rotation inputted from the forward/backward rotation switching mechanism 4 is inputted from the primary pulley 21 coaxially integrated with the input shaft 24 to the secondary pulley 22 through the belt 23.

The primary pulley 21 is composed of two sheaves 21a, 21b, and the secondary pulley 22 is composed of two sheaves 22a, 22b. The sheaves 21a, 22a are fixed in the axial direction, and the sheaves 21b, 22b are movable in the axial direction by means of a hydraulic actuator (not illustrated). The movable sheaves 21b, 22b of the primary pulley 21 and the secondary pulley 22 are synchronously movable in the axial direction. To reduce the driving speed, the movable sheaves 21b, 22b are driven in such a manner as to narrow a groove of the secondary pulley 22 and widen a groove of the primary pulley 21. To increase the driving speed, the width of the groove of the primary pulley 21 is narrowed, and the groove of the secondary pulley 22 is widened.

The rotation transmitted by the continuously variable transmission mechanism 20 is outputted from a second shaft 25 coaxially integrated with the secondary pulley 22, and is inputted from a drive gear 26 coaxially integrated with the second shaft 25 to a driven gear 28 pivotally supported by a third shaft 27. The third shaft 27 has a starting clutch 29 for connecting and disconnecting the third shaft 27 and the driven gear 28. The engagement of the starting clutch 29 integrates the driven gear 28 and the third shaft 27, and the rotation inputted in the driven gear 28 is transmitted to the third shaft 27 and is inputted from a differential output gear 30 axially integrated with the third shaft 27 to a ring gear 32 of a front differential gear 31. The front differential gear 31 distributes the output to the right and left axle shafts 33, 34.

According to the first embodiment, the hybrid powered vehicle that is constructed in the above-mentioned manner is able to run forward and backward in each driving mode by regulating the rotating directions of the engine 1 and the electric motor 2 and engaging and disengaging the clutch 15 as shown in FIG. 2.

The engagement of the clutch 15 integrates the sun gear 10 and the carrier 12, which are restricted by one another. This restricts the revolution of the pinion gear 11 supported by the carrier 12 around the sun gear 12 and the rotation of the inner gear 11a engaged with the sun gear 10. Additionally, the rotation of the outer gear 11b engaged with the inner gear 11a is restricted, and the relative rotation of the ring gear 13 engaged with the outer gear 11b with respect to the pinion gear 11 is restricted. In short, the sun gear 10, the carrier 12 and the ring gear 13 are integrated.

Accordingly, disengaging the brake 14 to permit the rotation of the ring gear 13 causes the sun gear 10, the carrier 12 and the ring gear 13 to rotate as one.

If the engine 1 and the electric motor 2 are rotated forward, a resultant force from the output of the engine 1 and the output of the electric motor 2 is inputted to the input shaft 24, and the engine 1 and the electric motor 2 are used as the drive source for the vehicle. It is also possible to rotate only the engine 1 forward with the electric motor 2 being idled so that the engine 1 can be used as the drive source for the vehicle. In this case, the output of the engine I rotates the rotor 7 of the electric motor 2, and this enables the use of the electric motor 2 for power generation.

On the other hand, the disengagement of the clutch 15 cancels the integration of the sun gear 10 and the carrier 12, and consequently, the sun gear 10 and the carrier 12 become capable of rotating relatively to one another. Therefore, the pinion gear 11 supported by the carrier 12 becomes capable of revolving around the sun gear 10. In the following description, the revolutions of the inner gear 11a, the outer gear 11b, the carrier 12 and the ring gear 13 are seen from the sun gear 10.

The inner gear 11a a engaged with the sun gear 10 also rotates in association with the revolution. The inner gear 11a rotates in the same direction as the revolving direction seen from the sun gear 10. In association with the rotation of the inner gear 11a, the outer gear 11b rotates in an opposite direction to the rotating direction of the inner gear 11a. The rotation of the outer gear 11b causes the ring gear 13 engaged with the outer gear 11b to rotate with respect to the pinion gear 11, in other words, with respect to the carrier 12 in the same direction as the rotating direction of the outer gear 11b. More specifically, the ring gear 13 rotates at a lower speed than the carrier 12 in a direction in that the pinion gear 11 (the carrier 12) revolves with respect to the sun gear 10. Seen from the sun gear 13, the pinion gear 11 revolves around the sun gear 10 in the opposite direction to the rotating direction of the sun gear 10.

Thus, if the brake 14 is engaged to restrict the rotation of the ring gear 13 with respect to the transmission case 9, the forward rotation of the sun gear 10 results in the backward rotation of the carrier 12 and the backward rotation of the sun gear 10 results in the forward rotation of the carrier 12. In fact, however, the sun gear 10 is rotated forward and the carrier 12 is rotated backward because the engine 1 connected to the sun gear 10 is capable of rotating only forward.

The backward rotation is inputted to the continuously variable transmission mechanism 20 by rotating the engine 1 forward and rotating the electric motor 2 backward. Consequently, the vehicle is driven backward by the engine 1 and the electric motor 2. It is also possible to rotate only the engine 1 forward with the electric motor 2 being idled, and in this case, the vehicle is driven backward by the engine 1. The output of the engine 1 rotates the rotor 7 of the electric motor 2, and this enables the electric motor 2 to function as a power generator.

As stated above, the forward driving and the backward driving can be switched by engaging and disengaging the clutch 15 and the brake 14. The engine 1 must be rotating whether the vehicle is running forward or backward. More specifically, idling the engine 1 requires an engine brake to operate, and driving the vehicle solely by the electric motor 2 increases a load and deteriorates an energy regeneration efficiency during the speed reduction.

In order to drive the vehicle solely by the electric motor 2 and improve the energy regeneration efficiency during the speed reduction, the clutch 15 is disengaged first. This cancels the integration of the sun gear 10 and the carrier 12, so that they can become capable of rotating relatively to one another. If the rotation of the ring gear 13 is restricted, however, the carrier 12 cannot rotate freely since the rotation of the carrier 12 follows that of the gear 10. To address this problem, the brake 14 and the clutch 15 are disengaged so as to permit the free rotation of the ring gear 13, and this enables the sun gear 10 and the carrier 12 to rotate independently of one another.

Consequently, the carrier 12 can rotate freely even when the engine 1 and the sun gear 10 are stopped. The forward rotation of the electric motor 2 causes the carrier 12 to rotate forward, and the forward rotation is inputted to the continuously variable transmission mechanism 20 to thereby drive the vehicle forward. The backward rotation of the electric motor 2 causes the carrier 12 to rotate backward, and this drives the vehicle backward. If the electric motor 2 is stopped to function as the power generator, the driving speed is reduced solely by a power generation resistance of the electric motor 2 whether the engine 1 is operating or stopped. Therefore, the energy can be regenerated efficiently.

Thus, the hybrid powered vehicle of the present invention has advantages as described below. The transmission of the rotation from the engine 1 to the transmission 3 is stopped by disengaging the clutch 15 and the brake 14 in the forward/backward rotation switching mechanism 4. Thus, the vehicle can be driven solely by the electric motor 2, and the energy can be regenerated during the speed reduction. Moreover, the vehicle can be driven solely by the engine 1 or by both the engine 1 and the electric motor 2. The energy efficiency can be improved by selecting a driving mode according to the driving conditions.

Since the vehicle can be driven by either the engine 1 or the electric motor 2, the vehicle is able to run continuously even if the engine 1 or the electric motor 2 experiences a problem or if the amount of a battery runs low.

The hybrid powered vehicle of the present invention uses the double pinion type planetary gear unit as the forward/backward rotation switching mechanism 4, and this substantially equalizes a reduction gear ratio during the forward driving and the backward driving. This eliminates the necessity of adjusting the reduction gear ratio of the continuously variable transmission mechanism 20.

Moreover, the hybrid powered vehicle of the present invention is able to start the engine 1 without using a starter when the vehicle is driven by the electric motor 2 with the engine 1 being stopped. More specifically, when the vehicle is driven forward by the forward rotation of the electric motor 2, the clutch 15 is engaged to input the rotation of the electric motor 2 to the engine 1 to thereby start the engine 1. When the vehicle is driven backward by the backward rotation of the electric motor 2, the brake 14 is engaged to convert the backward rotation of the motor 2 into the forward rotation, which is inputted to the engine 1 to start the engine 1.

Figure 4:
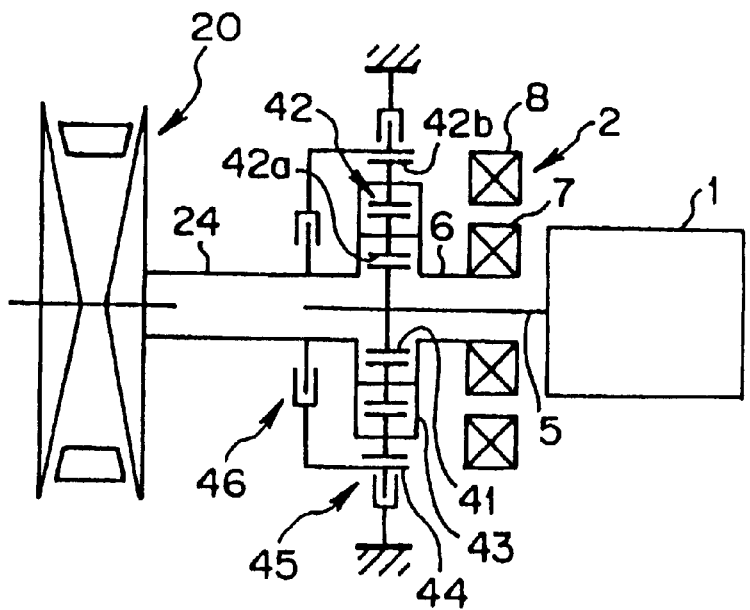
FIG. 4 is a view schematically showing a driving force transmission mechanism in a hybrid powered vehicle according to the third embodiment of the present invention.

The structure of the forward/backward rotation switching mechanism 4 in FIG. 4 is only an example among many. For example, the forward/backward rotation switching mechanism 4 may also be constructed in the second to fourth embodiments as described below.

Figure 3:
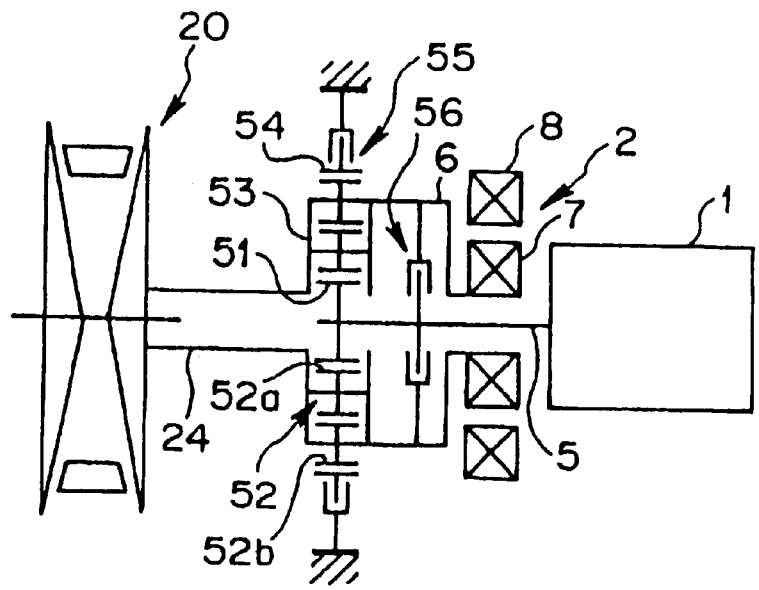
FIG. 3 is a view schematically showing a driving force transmission mechanism in a hybrid powered vehicle according to the second embodiment of the present invention.

A description will now be given of a forward/backward rotation switching mechanism in the hybrid powered vehicle according to a second embodiment of the present invention. As shown in FIG. 3, the second embodiment is different from the first embodiment only in the position of the clutch. More specifically, a clutch 56 is provided inside the output shaft 6 of the electric motor 2 in such a manner as to connect and disconnect the output shaft 6 of the electric motor 2 and the output shaft 5 of the engine 1. The engagement of the clutch 56 causes a sun gear 51 integrated with the output shaft 5 and a carrier 53 integrated with the output shaft 6 to be restricted by one another to rotate as one. In this embodiment, a pinion gear 52 is a double pinion gear composed of an inner gear 52a and an outer gear 52b as is the case with the first embodiment.

Accordingly, engaging the clutch 56 and disengaging the brake 55 cause the sun gear 51 and the carrier 53 to be restricted by one another to rotate as one. The rotation of the pinion gear 52 is also restricted, and this restricts the rotation of the ring gear 54. Thus, the sun gear 51, the carrier 53 and the ring gear 54 rotate as one.

If the engine 1 and the electric motor 2 are rotated forward, the vehicle is driven by both the engine 1 and the electric motor 2. If the engine 1 is rotated forward with the electric motor 2 being idled, the vehicle is driven solely by the engine 1.

If the sun gear 51 is rotated forward by disengaging the clutch 56 and engaging the brake 55, the carrier 53 rotates backward. If the engine 1 is rotated forward and the electric motor 2 is rotated backward, the vehicle is driven by the engine 1 and the electric motor 2. If the engine I is rotated forward with the electric motor 2 being idled, the vehicle is driven solely by the engine 1.

If the engine 1 and the sun gear 51 are stopped by disengaging the clutch 56 and disengaging the brake 55, the carrier 53 becomes capable of rotating freely. If the electric motor 2 is rotated forward, the carrier 53 also rotates forward to enable the vehicle to be driven solely by the electric motor 2. If the electric motor 2 is rotated backward, the carrier 53 also rotates backward to enable the backward driving of the vehicle.

A description will now be given of a forward/backward rotation switching mechanism in the hybrid powered vehicle according to a third embodiment of the present invention. As shown in FIG. 4, the third embodiment is different from the first embodiment only in the position of the clutch. A clutch 46 is provided outside the input shaft 24 of the continuously variable transmission mechanism 20 in such a manner as to connect and disconnect a ring gear 44 and the input shaft 24. The engagement of the clutch 46 causes a ring gear (the first element) 44 and a carrier (the third element) 43 integrated with the input shaft 24 to be restricted by one another to rotate as one. In this embodiment, a pinion gear 42 is a double pinion gear composed of an inner gear 42a and an outer gear 42b as is the case with the first embodiment.

Accordingly, the engagement of the clutch 46 causes the ring gear 44 and the carrier 43 to be restricted by one another to rotate as one. This restricts the rotation of the pinion gear 42, which is supported by the carrier 43, with respect to the ring gear 44, and also restricts the rotation of the outer gear 42b engaged with the ring gear 44. Moreover, the rotation of the inner gear 42a is restricted since it is engaged with the outer gear 42b, and the rotation of the sun gear 42 is restricted since it is engaged with the inner gear 42a. Thus, the sun gear 41, the carrier 43 and the ring gear 43 are integrated.

The sun gear 41, the carrier 43 and the ring gear 44 are rotated as one by disengaging the brake 45 to permit the rotation of the ring gear 44. Thus, the vehicle can be driven by both the engine 1 and the electric motor 2 by rotating the engine 1 and the electric motor 2 forward. The vehicle can be driven solely by the engine 1 by rotating the engine 1 with the electric motor 2 being idled.

The disengagement of the clutch 46 cancels the integration of the ring gear 44 and the carrier 43 to thereby make the carrier 43 rotatable with respect to the ring gear 44. Since the sun gear 41 connects to the ring gear 44 through the double pinion type pinion gear 42, the sun gear 41 rotates at a lower speed than the carrier 43 in the same direction as the rotating direction of the carrier 43 in association with the rotation of the carrier 43 with respect to the ring gear 44.

Thus, the carrier 43 is rotated backward by engaging the brake 45 and restricting the rotation of the ring gear 44 with respect to the transmission case 9. Therefore, if the engine 1 is rotated forward and the electric motor 2 is rotated backward, the vehicle is driven backward by both the engine I and the electric motor 2. If the engine 1 is rotated forward with the electric motor 2 being idled, the vehicle is driven backward solely by the engine 1.

If the clutch 46 is disengaged to cancel the integration of the ring gear 44 and the carrier 43 to enable their relative rotation and the brake 45 is disengaged to permit the free rotation of the ring gear 44, the carrier 43 becomes capable of rotating freely while the engine 1 and the sun gear 41 are stopped. Therefore, if the electric motor 2 is rotated forward, the carrier 43 rotates forward to drive the vehicle forward, and if the electric motor 2 is rotated backward, the carrier 43 rotates backward to drive the vehicle backward.

Figure 5:
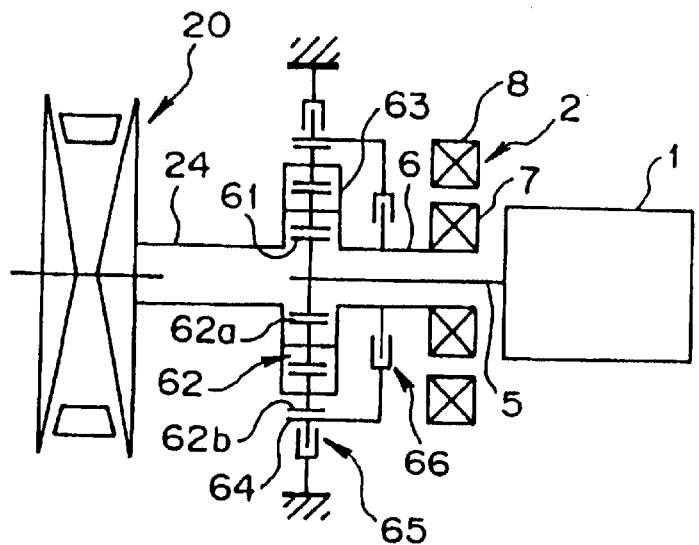
FIG. 5 is a view schematically showing a driving force transmission mechanism in a hybrid powered vehicle according to the fourth embodiment of the present invention.
Figure 6:
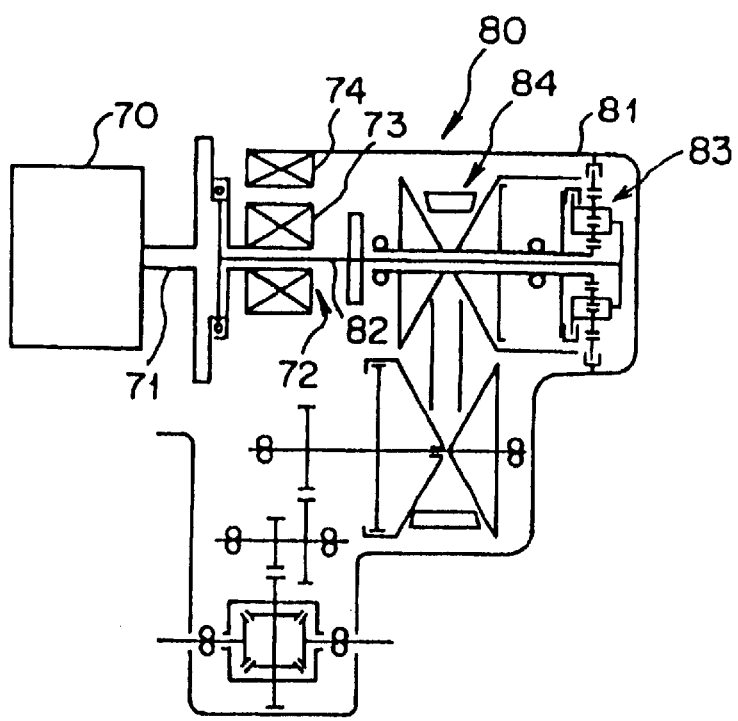
FIG. 6 is a view schematically showing a driving force transmission mechanism in a conventional hybrid powered vehicle.

A description will now be given of a forward/backward rotation switching mechanism in the hybrid powered vehicle according to a fourth embodiment of the present invention. As shown in FIG. 5, the fourth embodiment is different from the third embodiment only in the position of the clutch. In the fourth embodiment, a clutch 66 is provided outside the output shaft 6 of the electric motor 2 in such a manner as to connect and disconnect the output shaft 6 of the electric motor 2 and a ring gear 64. The engagement of the clutch 66 causes the ring gear 64 and a carrier 63 integrated with the ring gear 64 to be restricted by one another to rotate as one.

Accordingly, engaging the clutch 66 and disengaging a brake 65 causes the ring 64 and the carrier 63 to be restricted by one another to rotate as one. The rotation of a pinion gear 62, which includes inner gear 62a and outer gear 62b, is also restricted, and this restricts the free rotation of the sun gear 61. Thus, the sun gear 61, the carrier 63 and the ring gear 64 rotate as one.

Therefore, if the engine 1 and the electric motor 2 are rotated forward, the vehicle is driven by the engine 1 and the electric motor 2. If the engine 1 is rotated forward with the electric motor 2 being idled, the vehicle is driven solely by the engine 1.

If the sun gear 61 is rotated forward by disengaging the clutch 66 and engaging the brake 65, the carrier 63 rotates backward. In this case, if the engine 1 is rotated forward and the electric motor 2 is rotated backward, the vehicle is driven backward by the engine 1 and the electric motor 2. If the engine 1 is rotated forward with the electric motor 2 being idled, the vehicle is driven solely by the engine 1.

The carrier 63 can rotate freely even if the engine 1 and the sun gear 61 are stopped by disengaging the clutch 66 and the brake 65. If the electric motor 2 is rotated forward, the carrier 63 rotates forward to drive the vehicle forward solely by the electric motor 2, and if the electric motor 2 is rotated backward, the carrier 63 rotates backward to drive the vehicle backward.

As is the case with the first embodiment, the hybrid powered vehicle according to the second to fourth embodiments can be driven solely by the electric motor 2 and can regenerate the energy during the speed reduction. It is also possible to select whether to drive the vehicle solely by the engine 1 or both the engine 1 and the electric motor 2. The energy efficiency can be improved by selecting the driving mode according to the driving conditions. The second to fourth embodiments have the same advantages as the first embodiment.

It should be understood, however, that there is no intention to limit the invention to the specific forms disclosed, but on the contrary, the invention is to cover all modifications within the spirit and scope of the invention.

In the above-described embodiments, the second element is the sun gear, the third element is the carrier, and the first element is the ring gear. The clutch connects and disconnects the sun gear (the second element) and the carrier (the third element), or the carrier (the third element) and the ring gear (the first element). If, however, the motor 2 is arranged at the continuously variable 20, not at the forward/backward rotation switching mechanism, the clutch may be provided in such a manner as to connect and disconnect the sun gear (the second element) and the ring gear (the first element).

The ring gear, the sun gear and the carrier should not necessarily be the first element, the second element and the third element, respectively. Of course, it is possible to adopt alternate combinations on condition that the output shaft of the engine connects to one element (the second element) among the ring gear, the sun gear and the carrier; the output shaft of the electric motor and the input shaft of the transmission connect to one element (the third element) among the three elements; and one element (the first element) among the three elements is braked by the brake.

In the above-described embodiments, the transmission 3 is provided with the continuously variable transmission mechanism 20, but the present invention should not be restricted to this. The transmission 3 may also be provided with a normal gear transmission mechanism.

As set forth hereinabove, the transmission of the rotation from the engine to the transmission can be stopped by disengaging the clutch and the brake of the forward/backward rotation switching mechanism. Therefore, the vehicle can be driven solely by the electric motor, and the energy can be regenerated during the speed reduction. It is also possible to select whether to drive the vehicle by solely the engine or by both the engine and the electric motor. The energy efficiency can be improved by selecting the driving mode according to the driving conditions.

Moreover, the vehicle can be driven forward and backward by either the engine or the electric motor. Thus, the vehicle can continue to run in an emergency, e.g., if the electric motor goes wrong and if the amount of the battery runs short.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A hybrid powered vehicle comprising:
   an engine;
   an electric motor
   a transmission; and
   a forward/backward rotation switching mechanism coupled to an output shaft of said engine, an output shaft of said electric motor, and an input shaft of said transmission;
   wherein said forward/backward rotation switching mechanism comprises:
      a planetary gear unit including at least three elements: a ring gear, a sun gear and a carrier pivotally supporting a planetary pinion arranged between said ring gear and said sun gear;
      a brake for braking a first element, which is one of said three elements;
      connecting means for connecting and disconnecting two elements among said three elements; and
      wherein said output shaft of said engine is connected to a second element which is one of two elements except said first element, and said output shaft of said electric motor and said input shaft of said transmission are connected to a third element which is the other element of said two elements except said first element;
   wherein said output shaft of said engine and said second element always rotate in the same direction with each other, and the output shaft of said electric motor and the input shaft of said transmission always rotate in the same direction with each other; and
   wherein said vehicle can be selectively driven in a reverse direction by operation of said engine alone, said electric motor alone or a combination of said engine and said electric motor.

2. The hybrid powered vehicle as defined in claim 1, wherein said connecting means is a clutch.

3. The hybrid powered vehicle as defined in claim 2, wherein said first element is said ring gear.

4. The hybrid powered vehicle as defined in claim 3, wherein said second element is said sun gear.

5. The hybrid powered vehicle as defined in claim 4, wherein said clutch is arranged between said input shaft of said transmission and said sun gear.

6. The hybrid powered vehicle as defined in claim 4, wherein said clutch is arranged between said output shaft of said electric motor and said output shaft of said engine.

7. The hybrid powered vehicle as defined in claim 4, wherein said clutch is arranged between said input shaft of said transmission and said ring gear.

8. The hybrid powered vehicle as defined in claim 4, wherein said clutch is arranged between said output shaft of said electric motor and said ring gear.

9. The hybrid powered vehicle as defined in claim 1, wherein said transmission is a continuously variable transmission.

10. The hybrid powered vehicle as defined in claim 1, wherein said planetary gear unit is a double pinion type.

11. A hybrid powered vehicle as claimed in claim 1, wherein said electric motor is arranged coaxial with an output shaft of said engine, and said output shaft of said engine goes through an output shaft of said electric motor.

12. A hybrid powered vehicle as claimed in claim 1, wherein said output shaft of said electric motor, said input shaft of the transmission and said third element rotate at the same speed.

13. A hybrid powered vehicle comprising:
   an engine;
   an electric motor;
   a transmission; and
   a forward/backward rotation switching mechanism coupled to an output shaft of said engine, said output shaft of said electric motor, and an input shaft of said transmission;
   wherein said forward/backward rotation switching mechanism comprises:
      a planetary gear unit including at least three elements: a ring gear, a sun gear and a carrier pivotally supporting a planetary pinion arranged between said ring gear and said sun gear;
      a brake for braking a first element, which is one of said three elements;
      connecting means for connecting and disconnecting two elements among said three elements;
      wherein said output shaft of said engine is connected to a second element which is one of two elements except said first element, and said output shaft of said electric motor and said input shaft of said transmission are connected to a third element which is the other element of said two elements except said first element;
      wherein said forward/backward rotation switching mechanism further comprises control means for controlling operation and stoppage of said engine, switching between forward and backward rotations and idling of said electric motor, operation of said braking means and the connection and disconnection of said connecting means;
      wherein said vehicle can be selectively driven in a reverse direction by operation of said engine alone, said electric motor alone or a combination of said engine and said electric motor.

14. A hybrid powered vehicle as claimed in claim 13, wherein said control means controls operation such that said hybrid powered vehicle is selectively driven in either a forward direction or the reverse direction by either by one of said engine and said electric motor or by both of said engine and said electric motor by controlling operation and stoppage of said engine, switching between forward and backward rotations and idling of said electric motor, operation of said braking means and the connection and disconnection of said connecting means.

15. A hybrid powered vehicle as claimed in claim 13, wherein said electric motor is arranged coaxial with an output shaft of said engine, and said output shaft of said engine goes through an output shaft of said electric motor.

* * * * *